May 24, 1960     A. K. OZAI-DURRANI     2,937,946
PROCESS FOR PREPARING QUICK COOKING RICE

Filed Aug. 18, 1953

*INVENTOR.*
ATAULLAH K. OZAI-DURRANI

United States Patent Office 2,937,946
Patented May 24, 1960

2,937,946

PROCESS FOR PREPARING QUICK COOKING RICE

Ataullah K. Ozai-Durrani, P.O. Box 526, Stuttgart, Ark.

Filed Aug. 18, 1953, Ser. No. 374,946

15 Claims. (Cl. 99—80)

The present application is a continuation-in-part of my co-pending application Serial No. 352,301, filed April 30, 1953, and now abandoned.

The present invention relates to a novel process for preparing a quick cooking rice product which may contain substantially all of the nutritional and flavor components originally present in the rice grain and to the rice product obtained.

It is an object of the present invention to provide a quick cooking rice product of large grain size and which contains the desirable nutritional and flavor components of the rice in substantially the same quantities present in the original rice grains.

It is another object of the present invention to provide a quick cooking rice product of high nutritional quality and which possesses excellent physical and esthetic characteristics and which is not likely to become rancid during storage.

It is a further object of the present invention to provide a process for producing a quick cooking rice product which process is saving in time and materials and which may be conveniently conducted in a continuous fashion.

Other objects will be apparent to those skilled in the art from reading the specification which follows.

Figure 1:
Figure 2:
Figure 3:
Figure 4:
Figure 5:
Figure 6:

The invention will be described in part by reference to the appended drawing which comprises an enlarged photolithograph of grains of three rice products obtained by the present invention showing the excellent large grain size obtained and the attractive appearance of the grains as compared with the grains of three prior art rice products. Figures 1, 2 and 3 show enlarged grains of three products of the present invention. Figure 4 shows the product obtained according to my Patent No. 2,438,939. Figures 5 and 6 are of milled and parboiled rice, respectively.

The prior art is familiar with processes for preparing quick cooking rice products. Most of these processes either suffer from the defect of being somewhat time-consuming or relatively costly or more often the product produced has lost significant amounts of starch and other important nutritional and flavor components originally present in the rice grain. These losses result primarily from the soaking and cooking processes used to convert the slower cooking raw rice grains into a product which may be rapidly and easily prepared for the table by the consumer.

The prior art processes of preparing quick cooking rice usually involve a cooking step to soften the grains This cooking step, as well as other steps, in the preparation of these products, such as a water soaking step, require the use of excess amounts of water. Such treatment serves to solubilize and extract a goodly portion of the rice starch and valuable flavor, vitamin and mineral components from the rice grain. Treatment such as this may result in a loss of as much as 25% of the original weight of rice employed in the process. Obviously, such losses have serious economic disadvantages for upon removal of the soaking and cooking water, the soluble solids extracted from the rice grains are lost to the final product as they cannot be conveniently replaced.

One such prior art process for preparing a quick cooking rice is that disclosed in my prior Patent No. 2,438,939, which issued on April 6, 1948. While the process of this prior patent provides a quick cooking rice product which marked a significant step forward in the cereal art, and while I believe that the product obtained was the first successful commercial quick cooking rice product and is even today the foremost commercial quick cooking rice product, it does not overcome the disadvantage described above. The process of my patent comprises essentially soaking rice grains in excess water until they are substantially saturated with moisture, and then cooking them in excess boiling water to gelatinize the starch and increase the moisture content even further. After a washing with cold water, the gelatinized and moisturized rice is then dried in accordance with the method described in the patent. These soaking, cooking and washing steps all contribute to the removal of and loss of valuable starch, vitamins, mineral and flavor components from the grain.

Another more recent patent showing similar soaking and boiling treatment is that of R. L. Roberts, No. 2,610,124, which issued on September 9, 1952. Thus in spite of the need for improvement, the problem until now has gone unsolved.

In addition to the economic disadvantages inherent to the loss of the components in the rice grains, the losses in nutritional and esthetic values are also very important. In many parts of the world rice plays an important if not staple role in the human diet. In such cases it is critical that the nutritional, flavor and esthetic values remain substantially intact for if they are not available in the rice, the remainder of the diet may not compensate for their absence.

Even where rice plays only a minor role in the diet, the flavor, odor, texture and appearance of the rice are important considerations in addition to the esthetic pleasures derived from eating cooked foods which excel in these properties. The pleasure of eating attractive food whets the appetite and thereby provides the necessary stimulation to ingest a proper diet. One of the important features of the present invention is to provide a rice product which still possesses to an optimum degree the naturally-occurring esthetic values originally present in the rice in spite of the fact that the product also provides the convenience of quick cooking. This is a goal which the food producing industry has been striving to attain for many years. Additionally, this invention provides a product of large grain size which adds to the attractiveness of the product.

Shortcomings in the nutritional and esthetic properties are not limited to the quick cooking rice products of the prior art. Rice which has been cooked by the conventional cooking of milled or brown rice is equally deficient in these values. Most consumers desire a well-cooked rice product for the table, i.e., one in which the grains are soft and tender and not gritty or only partially cooked. The methods used in cooking white and brown rice require washing and rinsing prior to boiling for substantially long periods of time in large excesses of water. Consequently, washing and rinsing and most of all the cooking removes about 25% of the original weight of the rice and eliminates substantially all of the vitamins and minerals and most of the taste and flavor normally inherent to rice.

A method less frequently used in preparing rice for sale to the consumer is parboiling. Parboiling procedures may vary somewhat but in general they consist of soaking rice paddy (rice as harvested) in cool or warm water below the gelatinizing temperature (which is about 65° C.) of the rice grain. The water soaks into the rice grain and in doing so carries part of the soluble nutritional components contained in the rice bran into the kernel. The resulting soaked paddy is then parboiled by heating, usually by steam, above the gelatinizing temperature of the rice grain to produce gelatinization of the starch. The parboiled rice is then dried to a stable moisture content of about 10% to 14% to facilitate removal of the siliceous hull of the rice paddy and of the rice bran. The dried grain obtained after milling is hard and stiff and translucent. Such product must be cooked and because of its hard, stiff grain, it requires substantially more cooking time than ordinary dehulled rice, and even then the rice grains are never as soft as cooked ordinary rice or cooked quick cooking rice. Also, in spite of the fact that the parboiled rice contains about half of the natural vitamins found in harvested rice, it is not well accepted by consumers because its color, flavor, taste and texture are unusual to most rice-consuming people. Additionally this product is more costly than ordinary rice and is more difficult to mill after the parboiling treatment. Thus this product also does not meet the requirements of a satisfactory rice product.

As a means of compensating for the deficiencies of the prior art products discussed above, enrichment with one or more of the components which have been removed, or partially removed, has been considered. This, however, is by no means the answer to the problem, for enrichment entails added costs both in the materials to be used in the labor and time required to incorporate these materials into the grains. Also, difficulties inherent to the enrichment with some of these lost components make it impractical to provide a product which is equivalent in nutritional and esthetic values to the original rice grains. At best, enrichment cannot attempt to reproduce the flavor, taste and texture deficiencies of the rice products of the prior art.

As a result of an intensive research investigation I have discovered that I can produce, in accordance with the process of this invention, a rice product which is quick cooking, which possess a large grain size and an attractive appearance and texture, which retains the nutritional and flavor components originally present in the rice grain to an extent heretofore believed impossible, and which is relatively free from rancidity even after periods of shelf storage.

The process of the present invention is applicable to rice which has been dehulled and which is in any of the various stages of milling, i.e., brown rice which still has the outer bran layer containing all the oil, fats, vitamins and proteins, or the completely milled rice sold commercially as white rice and which comprises substantially only the endosperm which is primarily starch. Parboiled rice may also be treated in accordance with the process of the invention.

The process of the present invention comprises treating dehulled rice grains with a liquid, such as water, in such a manner as to progressively increase the moisture content. This treatment preferably coincides with a correlated increase in the temperature of the moisture and of the rice until the rice contains a maximum moisture content without producing an undue amount of rupturing of the walls of the starch cells contained within the rice grain. The point at which rupturing of the starch cells begins is somewhat dependent upon the variety of rice used. Some rice varieties will incur rupturing or disintegration of the starch cell walls when the moisture content reaches about 75%, while other rice will not up to a moisture content of about 82%. As stated above, this will vary somewhat upon the type of rice, but the percentage of moisture which will produce rupturing may easily be determined beforehand and precautions taken not to substantially exceed this concentration of moisture. The net result is that the starch cells of the rice grain are gradually softened by the combined increase in moisture content and in the temperature of the starch cells and moisture in the rice grains. The starch cells contained in the resulting rice grains will become greatly expanded in volume and will have softened with a substantial swelling and dispersal of the starch in the cells. The starch will be in a gelatinized, but uncooked, state. The gelatinized product may then be cooled and dried by suitable means, which will be hereinafter described, so as to reduce the moisture content to a percentage at which the rice may be stored with stability until used. A suitable stable-moisture content is between 10% and 14%. I find that if these conditions are observed an excellent product is obtained with grains of large dimensions, which are relatively free from "split-ends."

In treating the dehulled rice to progressively increase the water content I prefer to use only so much water as the rice will absorb at that particular temperature. It is convenient to increase the moisture content of the rice by passing the rice along screens and subjecting the moving rice to successive sprays of water. If desirable, the amount of water passing from the successive sprays may be varied, so that upon emergence of the rice from the sprays the moisture content of the rice grains has been raised to the desired percentage. The amount of water emerging from the sprays may be varied in accordance with the coefficient of absorption of the rice. This coefficient varies somewhat with different types of rice and with the temperature of the rice and of the water. It also varies with the extent of milling of the rice and other conditions, such as parboiling. The amount of water may, if desired, be progressively increased in the successive sprays; but preferably no more water is to be used than the rice grains can absorb. Also, in addition, the temperatures of the water in the sprays may be varied, as, for example, by supplying water of progressively increasing temperatures to the successive sprays.

As above pointed out, the quantity of water sprayed on to the rice is to be limited so as not to substantially exceed the amount which the rice grains can absorb. It is an important advantage of my process that it may be operated continuously as well as batch-wise. Also, it is not necessary to cook, soak or resoak the rice in baths of water during the process such as is done in other processes for preparing quick cooking rice products. Such cooking or soaking in baths of water usually results in a loss of some of the nutritive values and components, including starch, vitamins and minerals, due to extraction. The present process minimizes such losses. In the event that excesses of spraying water are used, arrangements should be made to return such excesses to the sprays so that the extracted solubles, such as starch, vitamins, sugars, dextrin and flavor, will be returned to the process and reused for fresh supplies of rice.

Spraying, I have found, permits the rice pores to absorb water quicker and transmit it more rapidly to the inner segments and interior of the grain than does submerging in a volume of water. Rice is hygroscopic in its physical behavior. When the humidity of the atmosphere is subjected to substantial changes the rice will gain or lose moisture accordingly and humidified air may be used to increase the moisture content.

In the preferred embodiment of my invention, dehulled or milled rice is contacted initially with a spray of water maintained at room temperature or of the temperature of the available water supply. The rice, contained, for example, in movable wire-screen baskets or passing along a suitable wire-screen movable conveyor, is passed under successive sprays, which may be of progressively rising temperatures until the temperature of the sprayed rice has been increased to a desired value. During the passage of the rice through the sprays the quantity of water emerging from the sprays may be adjusted so that the moisture content of the rice increases as the temperature of the sprays increases. In a preferred embodiment of my process, the temperature of the rice is not permitted to exceed the gelatinization temperature (about 65° C.) until the rice grains are completely saturated with water, i.e., until the rice contains approximately 30% total moisture and has increased about 10% in volume. From the standpoint of economy it is preferable to use water of the temperature of the normal water supply. The use of water of a temperature of between 20° and 60° C. prior to reaching a moisture content in the rice of about 30% is usually satisfactory. The use of water of gradually increasing temperature or of constant temperature in excess of that of the available water supply is not necessary during this initial soaking or saturation stage of the process.

It is advisable that the rice not absorb excess moisture during this initial saturation stage of the process. This is prevented by first determining the moisture content of the untreated rice and spraying only enough water over the rice to increase the total moisture content to about 30%.

The time necessary for the rice to reach the saturation point will depend upon the degree to which the grains have been milled and the temperature of the hydrating water sprays. For thoroughly milled rice, this usually requires about 30 minutes and somewhat longer for rice grains which have been previously parboiled or which have been subjected to a lesser degree of milling and which still have some of the bran coating surrounding the endosperm. Generally speaking, it may be said that from 15 to 120 minutes will suffice depending upon the factors mentioned above. In most cases where the process is conducted on a continuous basis using milled rice the entire process may be completed within one hour.

At this stage of the process, the rice, with a total moisture content of about 30%, feels dry to the touch and is freeflowing. However, when this grain is viewed under magnification, it will be seen to have small water droplets encircling the entire surface of the grain with slight undulations of the outer surface of the grain. A longitudinal or lateral cross-section of the grain when viewed under high magnification, will be found to comprise enlarged starch granules suspended in water. The grain is almost impervious to the transmission of light and appears to be a compressed, snow-like, white mass. Thus the translucency, which is accompanied by some white speckles, usually found in some dehydrated, completely milled, white grains, is transformed into a white opacity. During this initial hydration step or saturation stage, it is observed that the rice grain does not absorb moisture uniformly, but rather through five to eight or more distinct channels or segments running crosswise of the grain which distributes the moisture to other parts of the grain. Also, that end of the rice grain from which the embryo has been removed provides for rapid water penetration. It is probably for this reason that in the early stages of the hydration, the grains take on a checkered appearance. As the moisture content increases the rice grains become a solid opaque white mass which upon close examination will show the division of the grains into segments. The moisture seems to become equally distributed throughout the grain, particularly after one-half hour of spray treatment. The rice is easily friable to a granular, moist flour-like state. Brown rice, which still contains the bran coating, generally does not assume the same outward appearances and will not absorb water as rapidly as the completely milled white rice, but if the bran coating is removed from the grain, the starchy endosperm will be observed to have undergone the same transformations as the completely milled white rice.

It is not essential that the rice grains be completely saturated with moisture during this initial saturation treatment. In fact, as a practical matter, it is difficult to attain complete saturation without keeping the rice in contact with moisture over a rather substantial period of time. The moisture content at saturation will vary depending upon the temperature of the rice and water as well as the nature of the rice used. The saturation concentration at normal room temperatures is about 30% as stated hereinabove. Because of practical considerations this amount of moisture is rarely achieved without the application of heat for the reasons stated above. Concentrations of 27% to 29% total moisture may be considered the equivalent of complete saturation with moisture at this stage of the process for the purposes of the present invention. The moisture content of the rice grains after this so-called "initial saturation step" need not necessarily approach even this concentration, although a higher moisture content attained prior to gelatinization improves the quality of the final product.

The above described "initial saturation step" may also be completely or partially eliminated if the moisture content of the dehulled rice used as starting material has a substantial moisture content. For example, as described in one of my previous patents, parboiled rice may be milled at a moisture content of about 17% to 30%. In such a case it will not be necessary to subject the rice to the "initial saturation step." However, rice is usually reduced in moisture to a content of 10% to 14% to facilitate milling and to permit stable storage over long periods of time. Since the rice used usually contains only this amount of moisture, the "initial saturation step" is recommended in order to increase the moisture nearer to the saturation point.

I next prefer to take the dehulled rice, which may or may not have been subjected to previous moisture saturation treatment, and which thus may contain from between 10% and 14% to 30% moisture, and subject it to a treatment with hot water at a temperature of 60° or 70° C. to 100° C., and preferably between 80° and 90° C., for a period of about 30 seconds to 10 minutes. This hot water treatment may be conducted in a number of ways. Among other purposes served, this hot water treatment accomplishes a removal of the fatty material found on the surface or within the grain of the milled grains of rice. The removal of this fatty material is effected by a quick spraying of hot water over the surfaces of the grain more rapidly than the rice will abosrb or by submerging the rice in hot water for a short period and then removing the water.

The removal of the fatty material from the rice grains is important. Rice, even though very vigorously milled, contains about 0.3% of its weight of fatty material, most of which is in the form of a film over the surface of the grain. The fatty material consists of high and low molecular weight fractions. Some of these fractions are volatile, others are liquid at room temperature, while others are solids. The specific gravity of all fractions is less than that of water and thus all fractions will float on water. If this fatty material is permitted to remain on or in the rice grains, it tends to oxidize or decompose and causes rancidity of the rice when stored in an unventilated container, which is usually the case, or in a humid environment. This rancidification has a detrimental effect upon the nutritional components and imparts to the rice a disagreeable flavor and taste and a shaggy appearance to the grain. This rancidity persists in the rice during storage and even upon certain methods of cooking and other subsequent treatments with water. Steaming of the rice does not necessarily prevent rancidification. While escaping steam may remove some of the more volatile components of the fatty material, it appears to decompose or hydrolyze the higher molecular fractions to form higher fatty acids which may cause rancidity. This is shown by the fact that rice which has been steamed becomes rancid as does rice which has not been steamed. Thus the removal of the fatty material is a desirable step in the preparation of an esthetically satisfactory product.

The hot water treatment step described hereinabove produces other distinct advantages. Treatment at the temperatures recommended produces an almost spontaneous surface gelatinization of the rice grain which tends to seal off the surface of the grain by making the surface less permeable and thus tends to capture the internal water-soluble nutritional and flavor materials which might otherwise tend to escape from the rice grain during washing or further contact with the water. This treatment also makes the rice grains less fragile and more able to withstand further treatment without breaking or cracking. This contributes to another important advantage of the product of the invention which is relative freedom from misshapen, broken and split grains. During the course of the treatment the moisture content of the rice will increase to about between 35% and 60% total moisture. Thus this step produces an enhancement of the moisture content and some gelatinization of the starch due to the pre-heating of the rice. Both of these are important objectives of the process.

It is desirable to use no more water in removing the fatty material than is necessary, since all excesses of water have a tendency to extract and remove from the rice grains some of the valuable nutritional and flavor components. However, by using no more water than necessary these losses may be reduced to a negligible amount.

The hot water treatment also performs an additional function in that it tends to provide a more uniform, and therefore more attractive, rice product. Rice, when harvested, is not a uniform product. Even when rice grains are taken from the same stem or sheaf they differ in appearance from each other. For example, milled rice is not uniform in color. The general translucent grains are interspersed with white opaque spots. This lack of uniformity between grains makes the rice product less appealing to the consumer. The hot water step just described aids in making all the grains pleasantly and uniformly opaque. The resulting rice grains are slightly slippery to the touch and the surface has a sheen or glassy appearance rather than a dead white opaqueness as observed in the "initial saturation step." When chewed the product is gritty because most of its starch cells have not been softened by sufficient exposure to hot water and all of the cells have not been gelatinized to make the product edible in accordance with the eating standards of most people.

If desired, rice grains which have been subjected to the above hot water treatment in accordance with the present invention may be dried to a stable moisture content of from 10% to 14%, and in this form the rice will resist insect infestation and will be less subject to becoming rancid upon storage. Such dried rice is not readily subject to atmospheric changes. The product may be cooked in accordance with standard household cooking practices to provide a cooked rice having better taste, physical and nutritional values than milled rice which has been cooked.

As an alternative to the above hot water step, raw rice or dehulled rice may be first subjected to a flash steaming for a matter of a fraction of a minute with wet steam to agglomerate sugars and other materials which are normally found about the coating of the rice. This may be done without adding more than about 1% total moisture to the dehulled rice and only slightly raising its temperature. This treatment is of such short duration that substantially no gelatinization is permitted to occur and by agglomerating or stabilizing the sugars and other water-soluble materials found on the surface of the rice grain, the solvent treatment which follows is accelerated and the prevention of formation of undesirable emulsions during the solvent extraction which I will now describe is made possible. The rice which has been flash steamed is then subjected to a flash treatment with a fat-dissolving solvent, such as a low boiling petroleum fraction and preferably hexane or pentane, in liquid or vapor form for a period of a few seconds up to a few minutes.

When the solvent is washed over the grains it carries with it practically all of the fatty material normally found on or in the grain leaving intact most of the nutritive and flavor components.

Subsequent to the hot water washing treatment described above the grains may be optionally cooled by subjecting them to a cold water spray or a cold air blast. This treatment is strictly optional and is not necessary to obtain a satisfactory product.

The next phase of my preferred process may be said to comprise in general the subjecting of the rice to further spraying with moisture, desirably starting at the temperature of the last treatment of the rice and progressively increasing the temperatures until the temperature of the spraying water and the rice attain a temperature of approximately 100° C. During the course of this treatment the total moisture content will increase to between preferably about 60% and about 75%. The quantity of water sprayed over the rice should be limited so as not to substantially exceed the amount which the rice can absorb. The rice is white and somewhat stickier than the rice which contains about 30% moisture. The entire grain is tender throughout and easily crushed. It appears like and tastes like cooked rice. The volume of the rice grains becomes approximately two or three times that of the original non-hydrated rice.

I desirably accomplish the further heating and hydration of the rice described generally in the paragraph above in two steps, the first of which is to subject it to a wet steam or hot water spray which quickly increases the temperature of the rice grains to about 95° or 100° C. and provides a completely gelatinized, but not necessarily cooked, rice having about 5% more total moisture content than the hot water washed rice. Ordinarily the rice will contain about 40% to 67% total moisture after this gelatinization step and is flexible enough to withstand further mechanical manipulation. As described in connection with the "initial saturation step" described hereinabove this steaming step, which is accomplished by the use of wet steam or steaming boiling water sprays, should be practiced by using no more moisture than the rice will absorb, although rice which is gelatinized does not lose starch as rapidly as ungelatinized rice when treated with excess water. The rice grains are now translucent and are no longer segmented or slippery or friable. There is no grittiness upon chewing the grains. The starch in the cells of the grains is now of a homogenous nature and in the form of a semi-solution or colloidal dispersion in water.

As a result of the steaming treatment, the rice grains may adhere to each other and form aggregates. To break these up, it is advistable to subject these aggregates to a combined spray of hot air and hot water or alternately spraying the aggregates with hot air and then hot water. One should bear in mind that the water used in the sprays will be absorbed by the rice and contributes to the overall moisture content of the grains. Care should be taken to avoid any excessive agitation of the rice which may cause mechanical injury to the grains.

After the above described steaming or gelatinization step, the hot rice may, as the second step, be further exposed to a spray of either hot or cold water to increase the moisture content to a convenient maximum, which is usually about 70% total moisture or generally about 60% to 75% total moisture. It is preferable to use a hot water spray of boiling hot water for a period of time of about 2 minutes to 30 minutes depending upon the temperature of the spraying water and the moisture content of the rice at the beginning of the spraying treatment. The rice, upon reaching a maximum moisture content which will not materially rupture the starch cells, is now soft and tender. The product has been enlarged to about two or three times the original dimensions of the dehulled rice and has a distinctive taste and flavor found only in rice having a maximum concentration of its flavor components present.

If desired the moisturized and thoroughly gelatinized rice may also be optionally subjected to a jet of compressed air or other mechanical means for breaking up clumps of rice grains which may exist.

In a modification of the preferred embodiment described above, the rice grains may be passed through a continuous series of sprays of progressively increasing temperatures until the grains attain a temperature of about 100° C. and have imparted thereto a moisture content preferably between about 60% and 75%, without limiting the moisture content to about 30% before attainment of the gelatinization temperature.

In another modification, the rice may first be subjected to a flash steaming, i.e., steaming for a brief period such as a few seconds, and then passed through the sprays in accordance with the prefered embodiment of the invention. By such pre-steaming treatment any tendency of the rice grains to stick together is minimized.

The water sprayed onto the rice grains may, if desired, contain coloring or flavoring materials to enhance the taste and esthetic qualities of the rice.

The rice, after having been gelatinized and moisturized to an extent compatible with retaining the starch cell walls and identity of the grain intact, may then be treated in any suitable manner to reduce the moisture content of the rice grain so long as there is no substantial reduction of the increased size of the grain above referred to. This reduction of moisture content, or drying, may be accomplished by subjecting the grains to air drying until a stable moisture content of about between 10% and 14%, or about 13%, total moisture is reached. The drying temperature is not critical. A blast of hot or cold air, or any combination of these, may be suitably used. Alternatively, the rice grains may be chilled substantially below room temperature, either by cold water or cold air, and then subjected to a hot air blast. It is preferred that the air blast is forced through the spaces between the grains of the rice so that the moisture of each grain is reduced substantially simultaneously. There is thus obtained uniform dehydration throughout the grains of the rice without collapsing the cell walls.

A hot air blast of about 125° C. is preferred because it will remove moisture more rapidly than cold air and will prevent collapsing of the rice grains during the initial stages of the drying. Because of its more rapid drying, a hot air blast is more economical. A hot air blast will set the rice in an enlarged condition, and contributes to the further gelatinization and accomplishes to some extent initial cooking of the rice, and will produce voids in the rice grain due to the rather rapid escape of moisture from the interior of the grain. The production of internal voids or fissures in the rice grains is preferred since it will aid in accelerating cooking of the rice when prepared for eating. Since hot air will provide more rapid drying, the dried rice grains tend to be in a slightly more enlarged condition than grains dried by cold air.

When the moisture content is reduced to about 10% to 14%, the specific gravity is reduced to approximately between ½ and ⅓ of the original dehulled rice. The dried rice becomes segmented (about 6 to 8 segments) again when the moisture content reaches about 30% and these segments are retained in the product having a reduced moisture content of about 10% to 14%. The rice has a specific gravity of between about 0.4 and 0.6 depending upon the total amount of moisture incorporated into the product prior to drying and the conditions of drying. When viewed under magnification the grain is found to have a slightly rough surface with a number of very small protuberances. The grains have a white translucency and are of large size which imparts an attractive appearance to them. The grains are usually free from "split-ends" or cracks at the terminal end of the grain. The product retains a maximum of the vitamin, mineral and other nutritional components present in the rice used as the starting material as well as excellent flavor characteristics.

The quick cooking properties of the product of the invention are believed due in part to the fact that the dried product with a total moisture content of 10% to 14% is segmented roughly across the width of the grain into from 6 to 8 segments. These segments provide channels for the moisture to pass through. The rice starch has been gelatinized which also makes it more amenable to moisture absorption. Another very important factor is the fact that the starch cells have been dried in a swollen extended state thus providing greater surface area to absorb water. Another feature which contributes to rapid water absorption during cooking is the fact that when the rice is dried to a stable moisture content by rapid means, such as a hot air blast, some voids within the grain are produced. These voids serve as a channel for water absorption.

The excellent appearance of the novel products of the present invention is shown in the appended drawing. The first three rice grains at the top of the vertical column (Figs. 1, 2 and 3) are of three quick cooking products obtained in accordance with the present invention. The grains show their relatively larger size as compared with rice of the prior art. The segments running across the width of the grains are visible. All six figures were photographed at the same time so that all grains are enlarged to the same degree. Figure 1 shows a grain of the Niro variety of rice which has been dried by a hot air blast at 79° C. Figure 2 is a grain of Blue Bonnet rice dried under the same conditions. The grain of Figure 3 differs from that of Figure 2 in that the product has been dried at about room temperature, or 27° C. The somewhat opaque product of Figure 4 is the quick cooking product obtained in accordance with my Patent No. 2,438,939. The product of Figure 5 is raw or milled rice of the Blue Bonnet variety, sold under the trade name Carolina rice. The product of Figure 6 is parboiled converted rice, sold under the trade name Uncle Ben's rice.

An important modification of the present invention comprises subjecting the grains of rice, after having been treated by any one or more of the stages of the process recited above, to mechanical compression. After mechanical compression, the grains may, if desired, be returned to the process for further treatment. This compression serves to modify the structure of the grains even further and to aid in enhancing the absorption of moisture in any subsequent steps of the process and to enhance the quick cooking properties of the final product.

The mechanical compression referred to hereinabove may be accomplished by any of a number of means, such as by passing the grains through rolls or cylinders or by merely pressing the grains between two rigid surfaces. Various degrees of compression may be used, although excellent results may be obtained by compressing the width of the grains by about one-third of the width before compression. The technique of compressing and other features of such treatment are disclosed in more complete detail in my U.S. Patent No. 2,733,147.

I find, for example, that I may conveniently compress the rice after the hot water treatment described above, with or without drying or cooling the surface of the rice grains. As a result of the compression there takes place within the body of the grains a fracturing of the ungelatinized parts of the grains or any gelatinized part which has been chilled, or dried, or stiffened by brief contact with hot or cold water. The gelatinous casing in the present instance will serve as a container for the fractured internal structure. I find that, in particular, steaming or completely gelatinizing the rice grains after the compression step is desirable in obtaining an excellent quick cooking rice product.

Another desirable embodiment of the compression modification of my invention comprises subjecting the grains to compression after they have been treated by a spray of steaming water or steam to substantially completely gelatinize the entire grain and surface dried to a slight extent. This treatment imparts minute fractures to the grain coating so that after the grain has been dried to a stable moisture content it will absorb water very rapidly through the grain coating when cooked for table use. Such a product will cook in a comparatively short time. This dried product will have in addition to the fissures running across the width of the grain, a thin fissure transversing the center of the length of the grain.

Another important specific embodiment of the compression modification of my invention comprises mechanically compressing rice grains which have been treated with hot water, but during which water treatment no more than the external parts of the grains have been gelatinized, and then subsequent to compression treating the grains with steam or hot water to thoroughly gelatinize the grain. The moisture content may then be increased with hot or cold water until a total moisture content of about 60% to 75% is obtained. The grains may then be dried to a stable moisture content.

The product of the invention may be quickly and easily cooked without further loss of nutritional or flavor components. A convenient and recommended cooking technique comprises adding a cup and a quarter of water to a cup of the dried rice product of the invention. The mixture is brought to the boiling point, the source of heat is removed and the mixture is permitted to stand for about 10 minutes in a closed container. The rice absorbs all of the water and is ready to be served. The cooked rice product is of tender texture and excellent in flavor characteristics and appearance. Of course, the cooking procedure used may vary widely in accordance with the personal preferences of the consumer. For example, boiling water may be added to cover the rice product and after a few minutes time will be absorbed by and will cook the rice. Other procedures may also be used.

In order more clearly to disclose the nature of the present invention, specific examples illustrating the preparation of a typical product will hereinafter be described. It should be understood, however, that this is done solely by way of example and is intended neither to delineate the scope of the invention nor limit the ambit of the appended claims.

Example 1

About 6,000 grams of Rexoro milled rice was subjected to sprays of water at room temperature (about 26° C.) using 1,365 grams of spray-water. The rice became substantially saturated with water. The total weight of 7,365 grams indicated an increase of the total moisture content from 13.38% to 28.63%. The moisture-saturated rice was then immersed in a bath of hot water which initially had a temperature of 97° C. and after five minutes had a final temperature of 80° C. due to heat loss. The water was then removed from the rice and the rice was weighed. The weight of the rice which was now substantially free from fatty materials had increased to 7,500 grams indicating a total moisture content of about 39%. This rice was then placed in a perforated cylinder and exposed to a spray of steaming water for about five minutes to increase its weight to 7,900 grams indicating a total moisture content of about 41%. During this treatment practically all of the starch cells in the rice grains became gelatinized. The grain was rubbery to the touch. The flavor of the product was excellent. This product, while still hot from the water-steam spraying treatment, was then further subjected to spraying with hot water, also in an amount less than the amount that the rice would absorb. By this step the weight of the rice was increased to 13,495 grams of gelatinized and hydrated rice product indicating a moisture content of about 70%. The product then was about twice the size of the original rice grains and had a distinctive taste and flavor which was very appetizing and pleasing. This rice was then subjected to a hot air blast of about 80° C. until the moisture content of the rice was reduced to 13% total moisture. The resulting product had a specific gravity of 0.475 as compared to the 0.85 of the milled rice used as starting material.

The dried quick cooking rice produced in accordance with this example may be rapidly cooked by adding to one cup of the dried rice, one cup and a quarter of water and bringing the mixture to a boil. The source of heat is removed and the mixture left for 10 minutes with the pan covered. The rice absorbs all of the water. When eaten the rice has a tender texture and is of excellent flavor and contains a practical maximum of all the nutritional components originally present in the rice.

Example 2

About 15,000 grams of Blue Bonnet rice having a total moisture content of 11.6% was sprayed with 3,555 grams of water at 27° C. The water was absorbed by the rice increasing the moisture content to 28.5%. This substantially water saturated rice was then submerged in hot water of a temperature of 97° C. for 5 minutes during which the temperature of the water dropped to 79° C. This raised the weight of the rice by 5,155 grams and the moisture content to 44%. The rice was removed from the water bath and subjected to a steam-water spray for 150 seconds to increase the weight of the rice by 670 grams for a moisture content of 45% and the temperature to 99° C. The rice was then sprayed with cold tap water at 26° C. for 10 minutes during which the weight of the rice was increased by 13,155 grams to produce a moisture content of 64.75%. The product was dried with a hot air blast at 80° C. to a stable moisture content of 11.34%. The resulting dried quick cooking rice, a grain of which is shown in Fig. 2, had a specific gravity of 0.48 as compared to 0.85 for the original rice. The appearance, color, flavor and texture of the product was excellent.

When the rice of this example was cooked with one and a half times its volume of cold water, by bringing the mixture to a boil in 4 minutes, the heat removed, the container covered and permitted to stand for 11 minutes, the rice was found to be thoroughly cooked and excellent in every respect. Thes total moisture content of the cooked rice was found to be 75% and after draining the excess moisture and removing any excess moisture adhering to the grains, the internal moisture content was 69.46% of the weight of the grains.

As a further alternative the moisturized and gelatinized rice grains produced in accordance with the present invention may be quickly frozen, thereby providing a desirable product which need not be subjected to drying and which may be sold in frozen form. It may be quickly and readily cooked by the consumer by merely pouring hot water upon it or by thawing and warming the frozen material. Also if desired, the frozen grains may be dried after freezing by subjecting the product to a hot air blast; such dried product having marked advantages.

Where a hot air blast is used in drying the rice, the temperature of the rice should not be raised above the caramelization temperature of the starch. Hot air temperatures in the order of 125° C. are below the caramelization temperature of starch and may be suitably employed. The temperatures of the hot air blast may be varied according to the results desired, however, so long as the rice is not heated above its caramelization temperature.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. The method of treating rice grains comprising passing said grains through a series of liquid sprays of progressively increasing temperature to increase the moisture of the grains progressively to a desired point, while limiting the quantity of liquid from each spray so as not to substantially exceed the amount which the grains can absorb at the temperature of the spray treatment and gelatinizing and drying the grains.

2. The method of treating rice grains as defined in claim 1, comprising subjecting dehulled rice to a brief wet steam blast followed by brief contact with a fat-dissolving solvent prior to passing the grains through said series of liquid sprays.

3. The method of treating rice grains according to claim 1 comprising passing said grains through said series of liquid sprays to bring the moisture content and temperature of said grains to desired values, and thereafter freezing and drying said grains.

4. The method of treating rice grains comprising passing said grains through a series of liquid sprays to increase the temperature of said grains progressively to about 100° C. while increasing their moisture content to between about 60% and 75%, while limiting the quantity of liquid from each spray so as not to exceed substantially the amount which the grains can absorb at the temperature of the spray treatment, and drying the grains.

5. The method of treating rice grains comprising passing said grains through a series of liquid sprays to increase the temperature of said grains progressively to about 100° C. while increasing their moisture content to between about 60% and 75%, and limiting the amount of liquid sprayed on the grains before attainment of the gelatinization temperature to that required to increase their moisture content to about 30%, while limiting the quantity of liquid from each spray so as not to exceed substantially the amount which the grains can absorb at the temperature of the spray treatment during the elevation of the grain temperaure above the gelatinization temperature, and drying the grains.

6. The method of treating rice grains comprising passing dehulled grains through a series of water sprays of progressively increasing temperatures which add moisture to the grains at a rate no greater than the grains can absorb and in which the grains are not heated above about 65° C. until the rice grains contain about 30% total moisture, and gelatinizing and drying the grains.

7. The method of treating rice grains comprising passing dehulled grains through a series of water sprays of a temperature not exceeding 65° C. which increase the moisture content of the grains to substantially the saturation point without adding the water at a rate greater than the rice can absorb, treating the grains with hot water, subjecting the treated grains to moisture and steam until the total moisture content reaches about between 60% and 75% and the rice starch is gelatinized.

8. The novel method as described in claim 7, wherein the rice product is subsequently dried.

9. The method of treating rice grains which comprises spraying dehulled grains with water while regulating the time of exposure of the rice to the spray and the temperature of the water to increase the moisture content of the grains to about 30% while their temperature is still below about 66° C., and then spraying the grains with water at a higher temperature to increase the temperature of the grains to about 100° C. and further increase their moisture content to about 65–70% the amount of water so sprayed on the grains being limited at all times so as not to exceed substantially the amount that the grains can absorb.

10. The method of claim 9, in which the grains are finally dried rapidly to a stable moisture content of about 12–14%.

11. The process of claim 9, wherein the rice grains are subjected to flash steaming before being sprayed.

12. The process of claim 9, in which the hydrated grains are frozen.

13. The process of claim 12 in which the frozen grains are subjected to a blast of hot air and dried to a stable moisture content of about 12–14%.

14. The method of treating rice grains comprising passing dehulled grains through a series of water sprays of progressively increasing temperatures which add moisture progressively to the grains while limiting the temperature of the grains to a maximum of about 65° C. until after they have absorbed about 30% total moisture and thereafter limiting the quantity of liquid from each spray so as not to exceed substantially the amount that the grains can absorb, and gelatinizing and drying the grains.

15. The method of treating rice grains comprising passing dehulled grains through water to increase the moisture content of the grains to substantially the saturation point at a temperature not exceeding 65° C., subjecting the treated grains to moisture and heat by passing them through a series of sprays of progressively increasing temperature until the total moisture content is between about 60% and 75% and the rice starch is gelatinized while limiting the quantity of liquid from each spray so as not to exceed substantially the amount that the grains can absorb, and drying the grains.

References Cited in the file of this patent

UNITED STATES PATENTS

| | | |
|---|---|---|
| 1,925,267 | McKay | Sept. 5, 1933 |
| 2,195,165 | Choppin et al. | Mar. 26, 1940 |
| 2,438,939 | Ozai-Durrani | Apr. 6, 1948 |
| 2,498,573 | Ozai-Durrani | Feb. 21, 1950 |
| 2,592,407 | Fernandes | Apr. 8, 1952 |
| 2,610,124 | Roberts | Sept. 9, 1952 |